US012609591B2

(12) United States Patent (10) Patent No.: US 12,609,591 B2
Beck et al. (45) Date of Patent: Apr. 21, 2026

(54) SENSOR MOUNT FOR CORRELATED MOTOR AND SENSOR ALIGNMENT

(71) Applicant: Nidec Motor Corporation, St. Louis, MO (US)

(72) Inventors: Jeremy Beck, Fort Wayne, IN (US); Timothy H. Sullivan, Marcellus, NY (US); Bruce Nielsen, Madison, OH (US)

(73) Assignee: Nidec Motor Corporation, St. Louis, MO (US)

( * ) Notice: Subject to any disclaimer, the term of this patent is extended or adjusted under 35 U.S.C. 154(b) by 203 days.

(21) Appl. No.: 18/543,972

(22) Filed: Dec. 18, 2023

(65) Prior Publication Data

US 2024/0120810 A1 Apr. 11, 2024

Related U.S. Application Data

(63) Continuation-in-part of application No. 17/462,413, filed on Aug. 31, 2021, now Pat. No. 11,888,357.

(60) Provisional application No. 63/072,998, filed on Sep. 1, 2020.

(51) Int. Cl.
*H02K 11/225* (2016.01)
*H02K 5/15* (2006.01)
*H02K 21/16* (2006.01)

(52) U.S. Cl.
CPC ............. *H02K 11/225* (2016.01); *H02K 5/15* (2013.01); *H02K 21/16* (2013.01)

(58) Field of Classification Search
CPC .......... H02K 11/21; H02K 5/15; H02K 15/00; H02K 21/16
USPC ................................................. 310/68 B, 71
See application file for complete search history.

(56) References Cited

U.S. PATENT DOCUMENTS

2009/0309441 A1* 12/2009 Yang ...................... H02K 29/08
310/68 B
2018/0176428 A1* 6/2018 Frohlund ............... H04N 23/75

FOREIGN PATENT DOCUMENTS

CN 203445753 U * 2/2014
TW I43113 B * 12/2014
TW I463113 B * 12/2014

* cited by examiner

*Primary Examiner* — Jose A Gonzalez Quinones
(74) *Attorney, Agent, or Firm* — Hovey Williams LLP

(57) ABSTRACT

A method and apparatus serve to mount a calibrated encoder assembly to an electric motor so that a sensor output signal waveform produced by the calibrated encoder assembly is aligned with a back electromotive force (BEMF) waveform of the electric motor. The calibrated encoder assembly is fixed to an alignment plate, which is attached to the electric motor. The electric motor is rotated using a servo driven functional tester and the BEMF waveform of the electric motor is measured. The sensor output signal waveform is measured, and the alignment plate is adjusted relative to the electric motor to align the sensor output signal waveform to the BEMF waveform. The alignment plate is secured to the electric motor in the adjusted orientation.

9 Claims, 9 Drawing Sheets

SENSOR MOUNT FOR CORRELATED MOTOR AND SENSOR ALIGNMENT

CROSS-REFERENCE TO RELATED APPLICATIONS

This application is a continuation-in-part of identically-titled U.S. patent application Ser. No. 17/462,413, filed Aug. 31, 2021, which claims the priority benefit of identically-titled U.S. Provisional Patent Application Ser. No. 63/072, 998 filed Sep. 1, 2020, the entire disclosures of which are incorporated herein by reference.

FIELD OF INVENTION

The embodiments described herein relate generally to an electric motor, and more particularly, to an electric motor having an adjustable rotor position sensor mount for ease of field service of the rotor position sensor.

BACKGROUND

Some motors require a rotary encoder or sensor to track rotor position of the motor. Generally, there is a correlation between output signals of the encoder used to convey the rotary position and the actual rotary position of the rotor. Such rotary encoders need to be aligned to the motor to allow a motor controller to control torque and speed of the motor. In particular, the output signals from the rotary encoder need to align with back electromotive force (BEMF) waveforms of the motor windings of the motor. Typically, motors (such as IPM motors) are aligned when assembled and shipped to an end user. However, such an alignment needs to be replicated in the event that the rotary encoder is replaced by the end user (such as in instances where the rotary encoder is damaged or otherwise fails).

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a method for mounting a calibrated encoder assembly to an electric motor is provided. A sensor output signal waveform produced by the calibrated encoder assembly is aligned with a back electromotive force (BEMF) waveform of the electric motor. The method includes coupling the electric motor to a servo driven functional tester. The method also includes fixing the calibrated encoder assembly to an alignment plate and coupling the alignment plate to the electric motor. Furthermore, the method includes rotating the electric motor using the servo driven functional tester and measuring the BEMF waveform of the electric motor and the sensor output signal waveform using a data acquisition unit. Moreover, the method includes adjusting an orientation of the alignment plate relative to the electric motor to align the sensor output signal waveform to the BEMF waveform within a predetermined measurement range, and securing the alignment plate to the electric motor in the adjusted orientation.

In another aspect, an electric motor assembly is provided. The electric motor assembly includes a motor having a stator assembly, a rotor assembly comprising a rotor shaft rotatable about a rotor axis, and a housing defining a motor chamber. The motor chamber receives at least a portion of the rotor assembly and the stator assembly. The housing includes an endshield rotatably supporting the shaft. The motor also includes a sensor target fixed relative to the rotor shaft and thereby oriented in a known position relative to a back electromotive force (BEMF) waveform of the electric motor. The electric motor assembly also includes a rotary position sensor configured to sense the sensor target and an alignment plate. The rotary position sensor is fixed relative to the alignment plate. Furthermore, the alignment plate is adjustably coupled to the endshield for rotational adjustment that is substantially concentric with the rotor axis, such that the rotary position sensor is adjustable to align a signal waveform produced by the rotary position sensor with the BEMF waveform within a predetermined measurement range.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
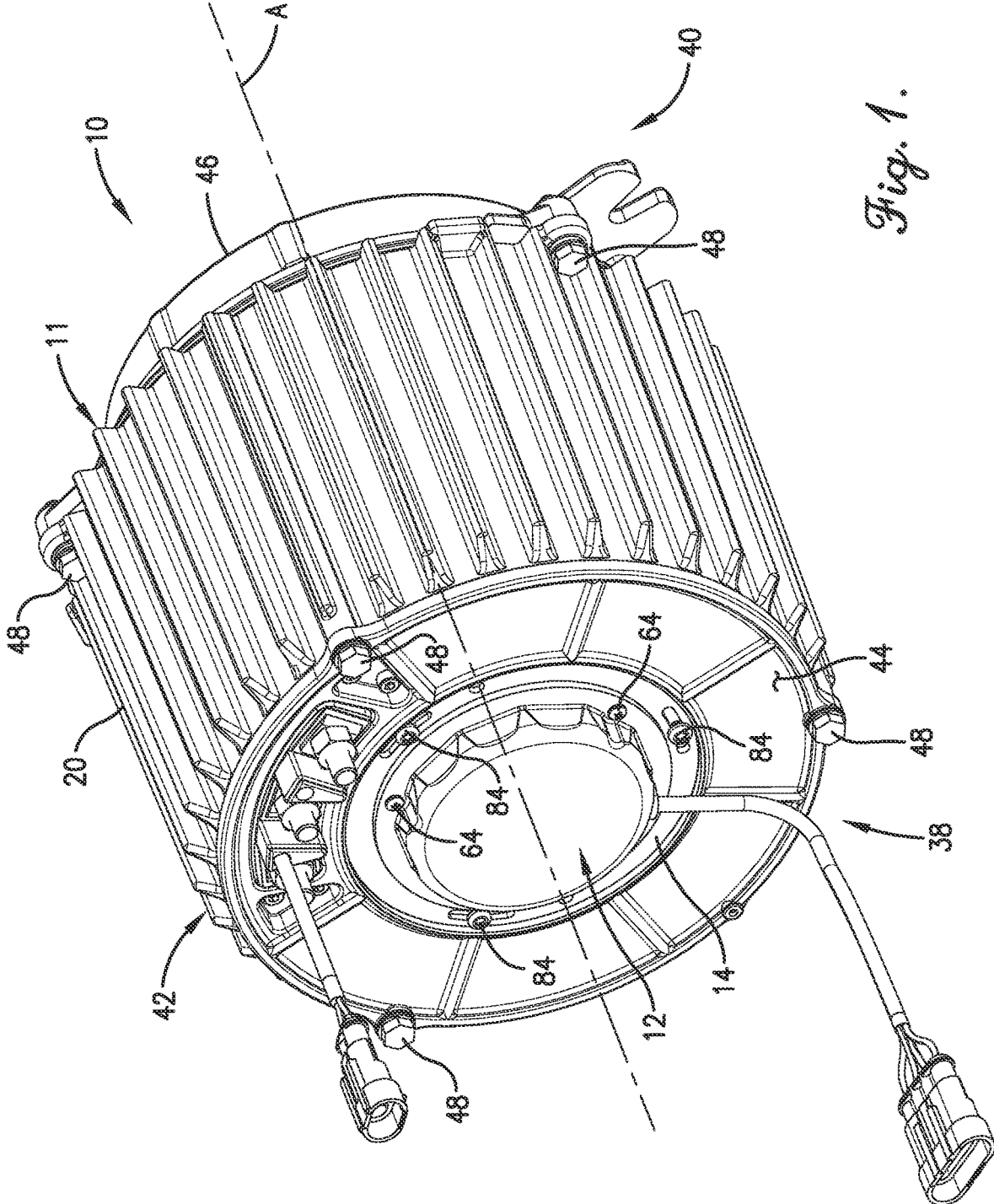
FIG. 1 is a perspective view of an exemplary electric motor assembly, in accordance with one aspect of the present invention.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made, without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal or rotation axis of an electric motor assembly. The terms "radial" and "radially" refer to directions and orientations extending substantially perpendicular to the rotation axis. The terms "tangent" and "tangential" refer to the directions and orientations extending substantially perpendicular to a radial direction of the electric motor assembly. In addition, as used herein, the terms "circumferential" and "circumferentially" refer to directions and orientations extending in the general direction around the rotation axis of the electric motor assembly (such references not being limited to pure circular extension or to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Broadly, the system and techniques described herein provide a process for mounting a calibrated rotary position sensor to an electric motor so that a sensor output signal waveform produced by the calibrated rotary position sensor is aligned with a back electromotive force (BEMF) waveform of the electric motor assembly. The system and techniques provide motors and rotary encoders that, from an alignment standpoint, are interchangeable. The system includes an adjustable encoder mounting ring (also referred to herein as an "alignment plate") coupled to the electric motor. The alignment plate may be rotated about a rotation axis of the motor to provide the desired alignment, and the plate may then be secured or locked in place such that any calibrated rotary encoder mounted to the alignment plate provides the same correlated rotor angle output signal. By providing an individually calibrated motor assembly and rotary encoder, the invention provides interchangeable components. The advantages include a system providing field service of the rotary encoder, without degradation in system performance, which is otherwise unavailable in current electric motor assemblies.

Exemplary Electric Motor Assembly

Figure 2:
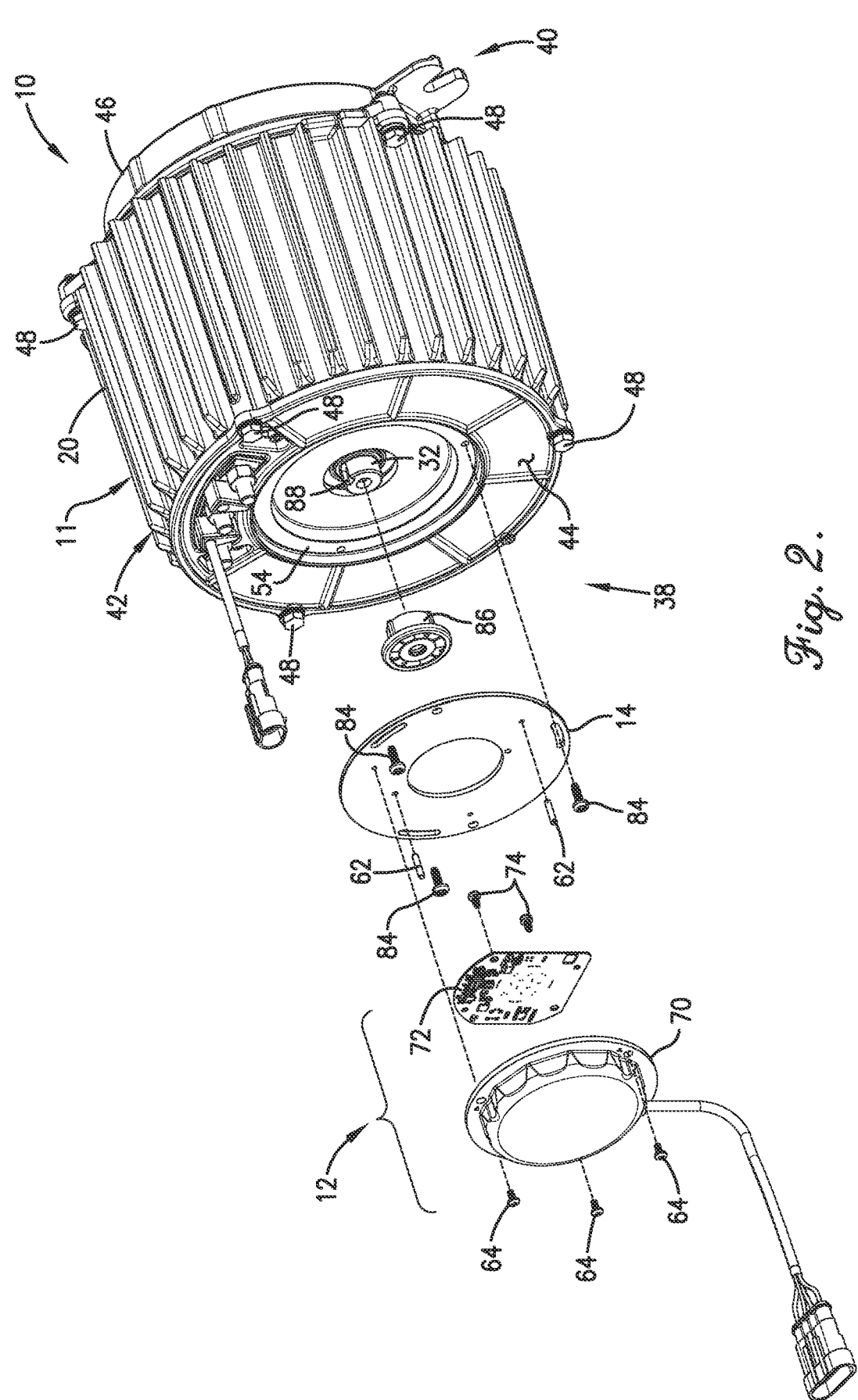
FIG. 2 is an exploded perspective view of at least a portion of the electric motor assembly.
Figure 3:
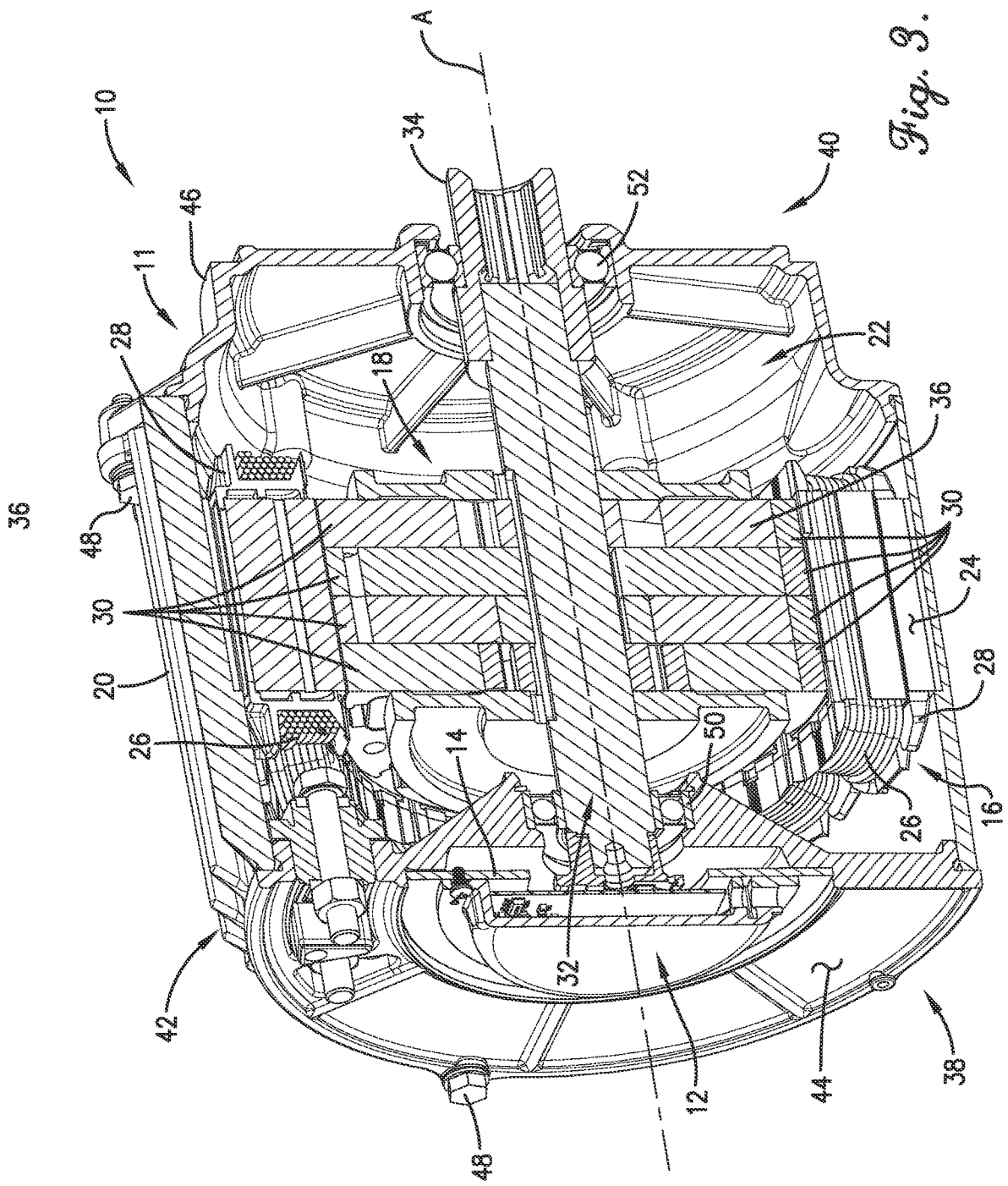
FIG. 3 is a sectioned perspective view of the electric motor assembly.

FIG. 1 is a perspective view of an exemplary electric motor assembly 10, in accordance with one aspect of the present invention. FIG. 2 is an exploded perspective view of at least a portion of the electric motor assembly 10. FIG. 3 is a sectioned perspective view of the electric motor assembly 10. In the exemplary embodiment, the electric motor assembly 10 includes an electric motor 11 and a rotary encoder assembly 12 coupled thereto via a sensor alignment plate 14. The electric motor 11 is depicted in the figures as an inner rotor motor. An inner rotor motor has magnets positioned radially inward relative to windings, which function as a stator. However, according to some aspects of the present invention, the electric motor 11 may alternately be an outer rotor motor or dual rotor motor.

As shown in FIG. 3, the electric motor 11 broadly includes a stator assembly 16 and a rotor assembly 18 substantially enclosed within an outer shell 20. The rotor assembly 18 is supported for rotation relative to the stator assembly 16 about a rotation axis "A." The outer shell 20 is generally cylindrical in shape and includes a motor chamber 22 for receiving at least a portion of the stator assembly 16 and the rotor assembly 18.

The stator assembly 16 is generally toroidal in form and defines a stator axis that is coaxial with the rotation axis "A." However, according to some aspects of the present invention, it is permissible for the axes to be axially offset. The stator assembly 16 preferably includes a stator core 24 and a plurality of coils 26 wound about the stator core 24. Furthermore, in some embodiments, the stator assembly 16 includes a plurality of electrically insulative coverings 28 positioned between the stator core 24 and the coils 26.

The stator core 24 preferably is fabricated from steel and may be of either solid or laminated construction. Alternatively, or additionally, the stator core 24 may be segmented in form. However, according to certain aspects of the present invention, the stator core 24 may alternatively be fabricated from any one or more of a variety of suitable materials and/or construction methods.

The stator core 24 preferably includes an annular yoke (not shown) and a plurality of arcuately spaced apart teeth (not shown) extending at least generally radially inward from the yoke. It is contemplated that the stator core 24 can have any number of teeth that enables the electric motor 11 to function as described herein. The plurality of coils 26 are formed by electrically conductive wiring wound being about each of the teeth. The wiring encircles each tooth to form the coils 26, with each of the coils 26 corresponding to one of the teeth. The wiring is preferably copper, although aluminum or any one or more of a variety of electrically conductive materials may be used without departing from the scope of the present invention.

In the exemplary embodiment, the rotor assembly 18 is depicted as a brushless permanent magnet rotor assembly and includes a rotor core 30, a rotor shaft 32, and a shaft coupler 34. The rotor shaft 32 defines a rotor axis for the rotor assembly 18. The rotor assembly 18 also includes a plurality of magnets 36. The rotor axis of the rotor assembly 18 is coaxial with the rotation axis "A." It is noted, that according to certain aspects of the present invention, the rotor core 30 may be constructed for use in an electric generator or other electric machine that includes the stator assembly 16.

The rotor core 30 is generally cylindrical in form and preferably is fabricated from steel. The rotor core 30 may be of either solid or laminated construction. Alternatively, or additionally, the rotor core 30 may be segmented in form. However, according to certain aspects of the present invention, the rotor core 30 may alternatively be fabricated from any one or more of a variety of suitable materials and/or construction methods.

As described above, the electric motor 11 includes the outer shell 20. The outer shell 20 is generally cylindrical in shape and extends generally circumferentially about the stator assembly 16. Alternatively, according to certain aspects of the present invention, the outer shell 20 may extend about the stator assembly 16 in such a way as to provide one or more flat sides or to be otherwise alternatively shaped. In the exemplary embodiment, the outer shell 20 presents axially opposite first and second shell ends 38 and 40, respectively, and extends substantially continuously about the stator assembly 16 and rotor assembly 18 to enclose, at least in part, the stator assembly 16 and the rotor assembly 18. According to certain aspects of the present invention, the outer shell 20 includes openings or slots therethrough. For example, in certain embodiments, one or more openings or slots may be provided to facilitate ventilation and/or access.

The outer shell 20 forms a portion of a motor case 42 of the electric motor 11. The motor case 42 includes the outer shell 20 and first and second endshields 44 and 46, respectively. The outer shell 20 and the first and second endshields 44 and 46 cooperatively define the motor chamber 22 that at least substantially receives the stator assembly 16 and the rotor assembly 18. More particularly, the first endshield 44 is positioned adjacent the first shell end 38 and coupled thereto. In addition, the second endshield 46 is positioned adjacent the second shell end 40 and coupled thereto. Specifically, the outer shell 20 is coupled to and held in place between the first and second endshields 44 and 46 by a plurality of fasteners 48. It is contemplated that, in certain aspects of the present invention, one more of the first and second endshields 44 and 46 may be located inwardly or spaced outward from the respective shell ends 38 and 40.

The electric motor 11 includes first and second bearing assemblies 50 and 52 that cooperatively rotatably support the rotor shaft 32 of the rotor assembly 18. The first endshield 44 is configured to support the first bearing assembly 50, and the second endshield 46 is configured to support the second bearing assembly 52. Alternative or additional bearing assembly supports may be provided without departing from the scope of the present invention.

Figure 4:
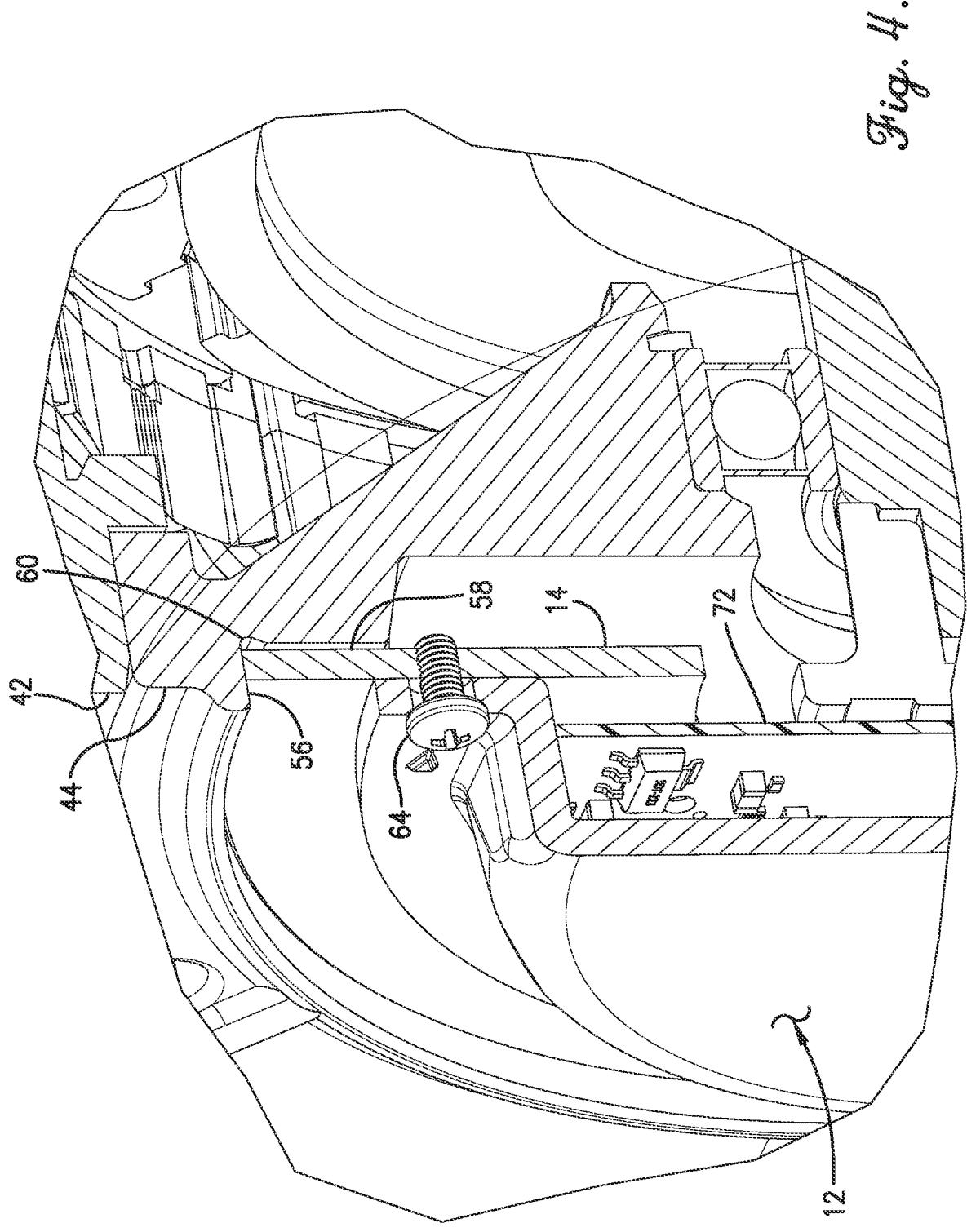
FIG. 4 is an enlarged portion of FIG. 3, illustrating details of a counterbore defined in an endshield of the electric motor assembly.

The first endshield 44 includes a counterbore 54 defined therein, as illustrated in FIG. 2. The counterbore 54 is substantially concentric with the rotation axis "A." Referring to FIG. 4, which is an enlarged portion of FIG. 3, the counterbore 54 is defined, in part, by an annular wall 56, which is substantially concentric with the rotation axis "A," and a planar base wall 58. The base wall 58 is substantially perpendicular to both the annular wall 56 and the rotation axis "A." The counterbore 54 includes a relief cut 60 defined between the annular wall 56 and the adjacent planar base wall 58 (i.e., at the intersection of the annular wall 56 and the base wall 58). In general, the relief cut 60 is sized and shaped to enable the alignment plate 14 to sit flush against the base wall 58.

The counterbore 54, and more particularly, the annular wall 56, has an inner diameter that is sized to cooperate with an outer diameter of the alignment plate 14 to define a slip fit therebetween. As used herein, the phrase "slip fit" means a value of tightness between the annular wall 56 and an outer periphery of the alignment plate 14, i.e., an amount of clearance between the two (2) components. A small amount of positive clearance is referred to as a slip, loose, or sliding fit. A negative amount of clearance is commonly referred to as a press fit, where the magnitude of interference determines whether the fit is a light interference fit or interference fit.

In the exemplary embodiment, an end of the rotor shaft 32 includes a notch 88 defined therein for receiving a cooperating member (not shown) of a sensor target 86. The sensor target 86 is secured onto the end of the rotor shaft 32, for example, by a fastener (not shown). The sensor target 86 includes a key-like member that engages the notch 88 to rotationally fix the sensor target 86 relative to the rotor shaft 32, and thereby orient the sensor target in a known position relative to a back electromotive force (BEMF) waveform of the electric motor 11.

Figure 5:
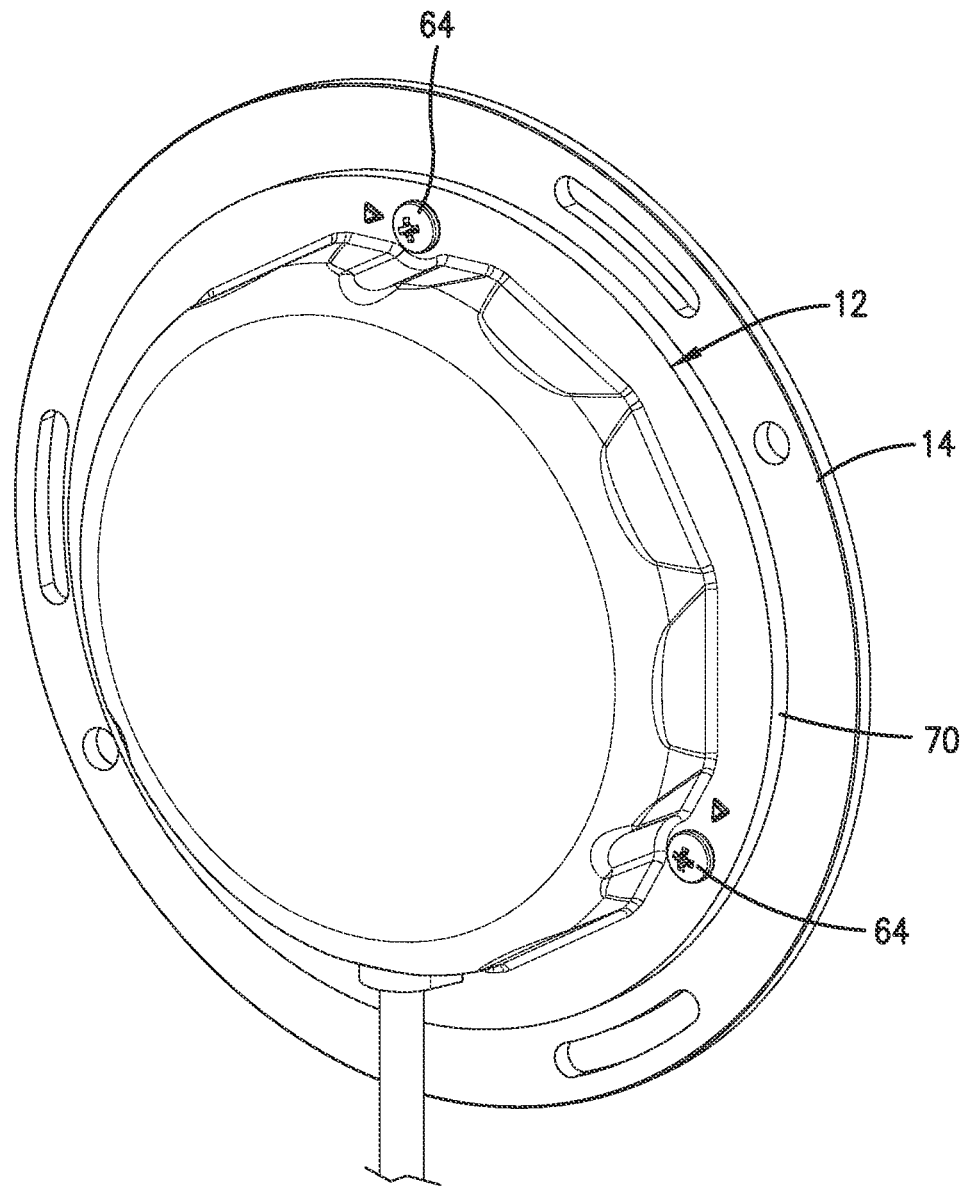
FIG. 5 is a front perspective view of an encoder assembly of the electric motor assembly, coupled to a sensor alignment plate.
Figure 6:
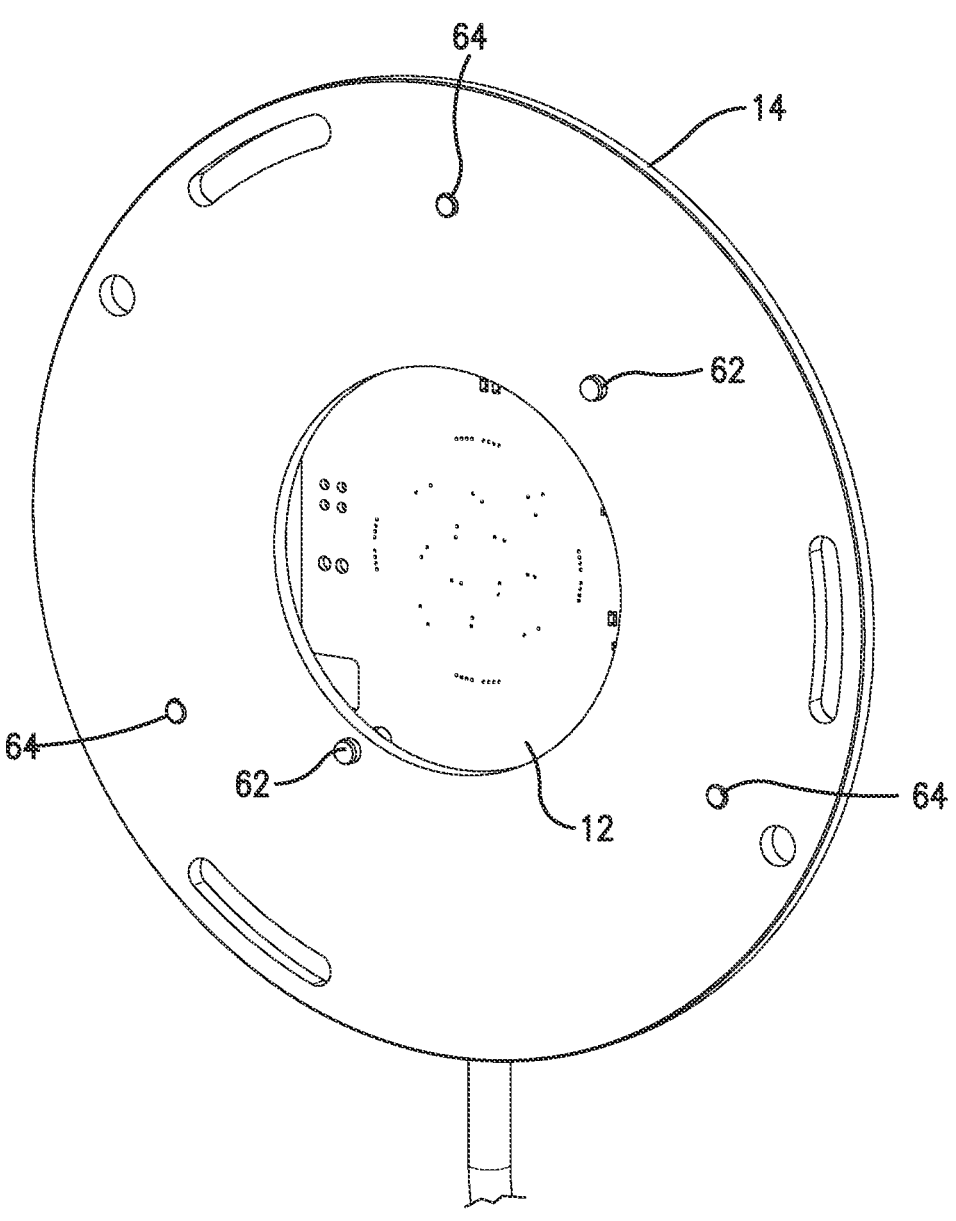
FIG. 6 is a rear perspective view of the encoder assembly coupled to the sensor alignment plate.
Figure 7:
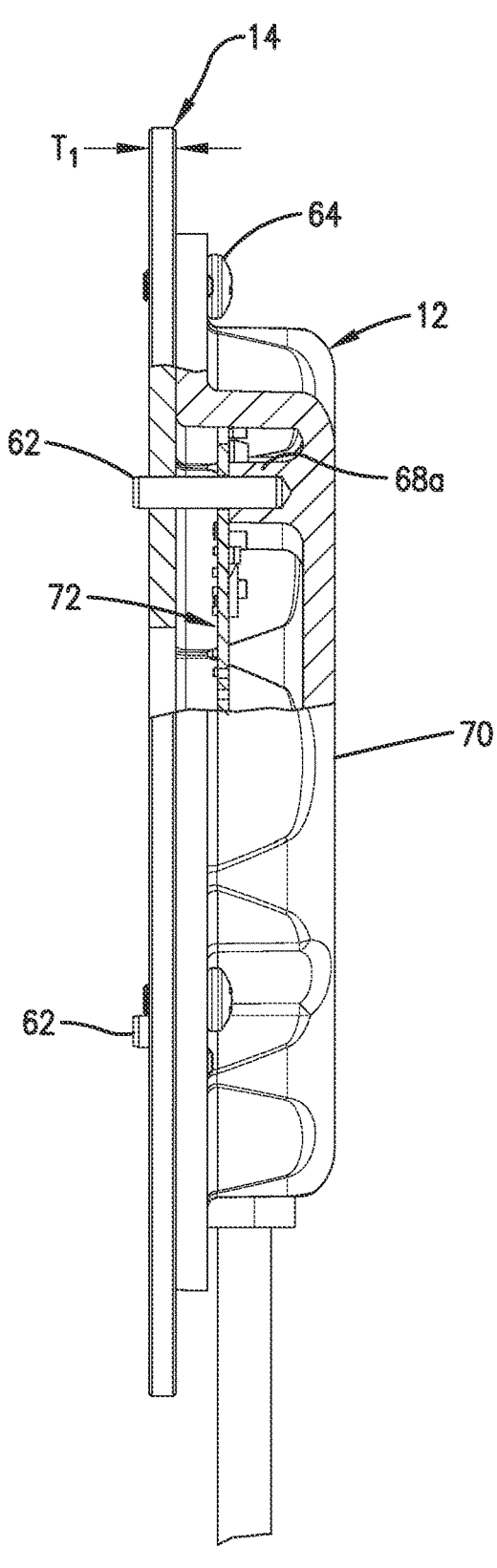
FIG. 7 is a partial side section view of the encoder assembly coupled to the sensor alignment plate, illustrating an alignment pin used to align the encoder assembly to the sensor alignment plate 14.

FIG. 5 is an enlarged, front perspective view of the rotary encoder assembly 12 coupled to the sensor alignment plate 14, without the electric motor 11. FIG. 6 is an enlarged, rear perspective view of the rotary encoder assembly 12 coupled to the sensor alignment plate 14, without the electric motor 11. FIG. 7 is a partial side section view of the encoder assembly 12 coupled to the sensor alignment plate 14, illustrating alignment pins 62 used to align the encoder assembly 12 to the sensor alignment plate 14. In the exemplary embodiment, the rotary encoder assembly 12 is coupled to the sensor alignment plate 14 via a plurality of fasteners 64. While three (3) fasteners 64 are shown in FIGS. 2, 5, and 6, it is contemplated that the rotary encoder assembly 12 may be coupled to the sensor alignment plate 14 using fewer or more fasteners 64.

Referring to FIGS. 6 and 7, the rotary encoder assembly 12 is aligned or oriented relative to the sensor alignment plate 14 via a plurality of alignment pins 62. While two (2)

alignment pins 62 are shown in FIGS. 6 and 7, certain aspects of the present invention contemplate that the rotary encoder assembly 12 may be aligned to the sensor alignment plate 14 using fewer or more alignment pins 62. Each alignment pin 62 is fitted into a respective opening 66a or 66b (shown in FIG. 8) of the sensor alignment plate 14 and a respective alignment pin hole 68a or 68b formed in a sensor housing 70 of the rotary encoder assembly 12. The alignment pins 62 function to fix or secure the rotational orientation of the rotary encoder assembly 12 relative to the sensor alignment plate 14.

Figure 8:
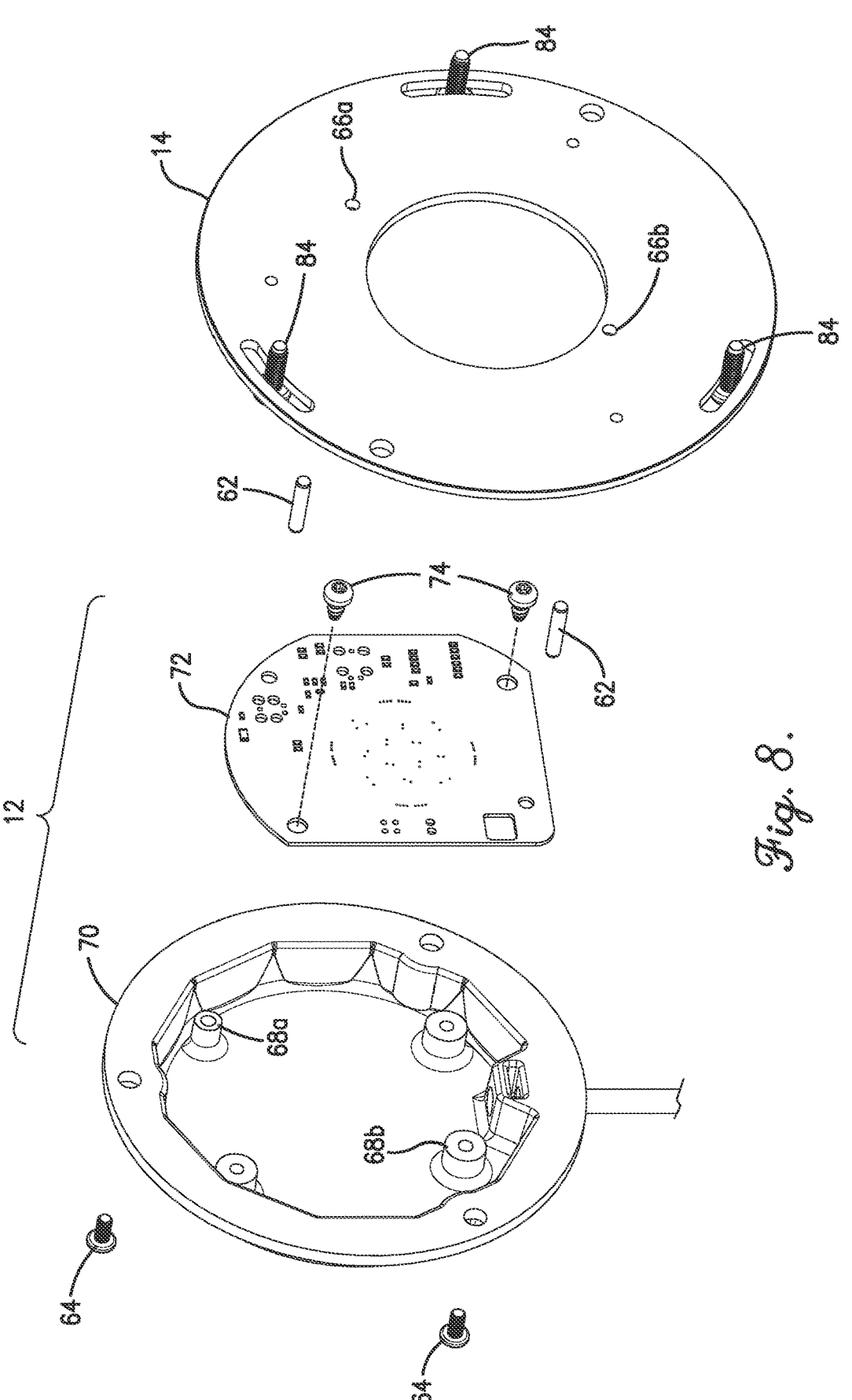
FIG. 8 is an exploded perspective view of the encoder assembly and the alignment plate.

As shown in FIGS. 2 and 8, the rotary encoder assembly 12 includes a sensor circuit 72 enclosed within the housing 70. The sensor circuit 72 may be coupled to the housing 70 using, for example, one or more fasteners 74. In addition, the sensor circuit 72 may be encapsulated with a potting material (not shown) to facilitate fixing or securing the sensor circuit 72 and insulating the sensor circuit 72, for example, from electrical shorting.

Figure 9:
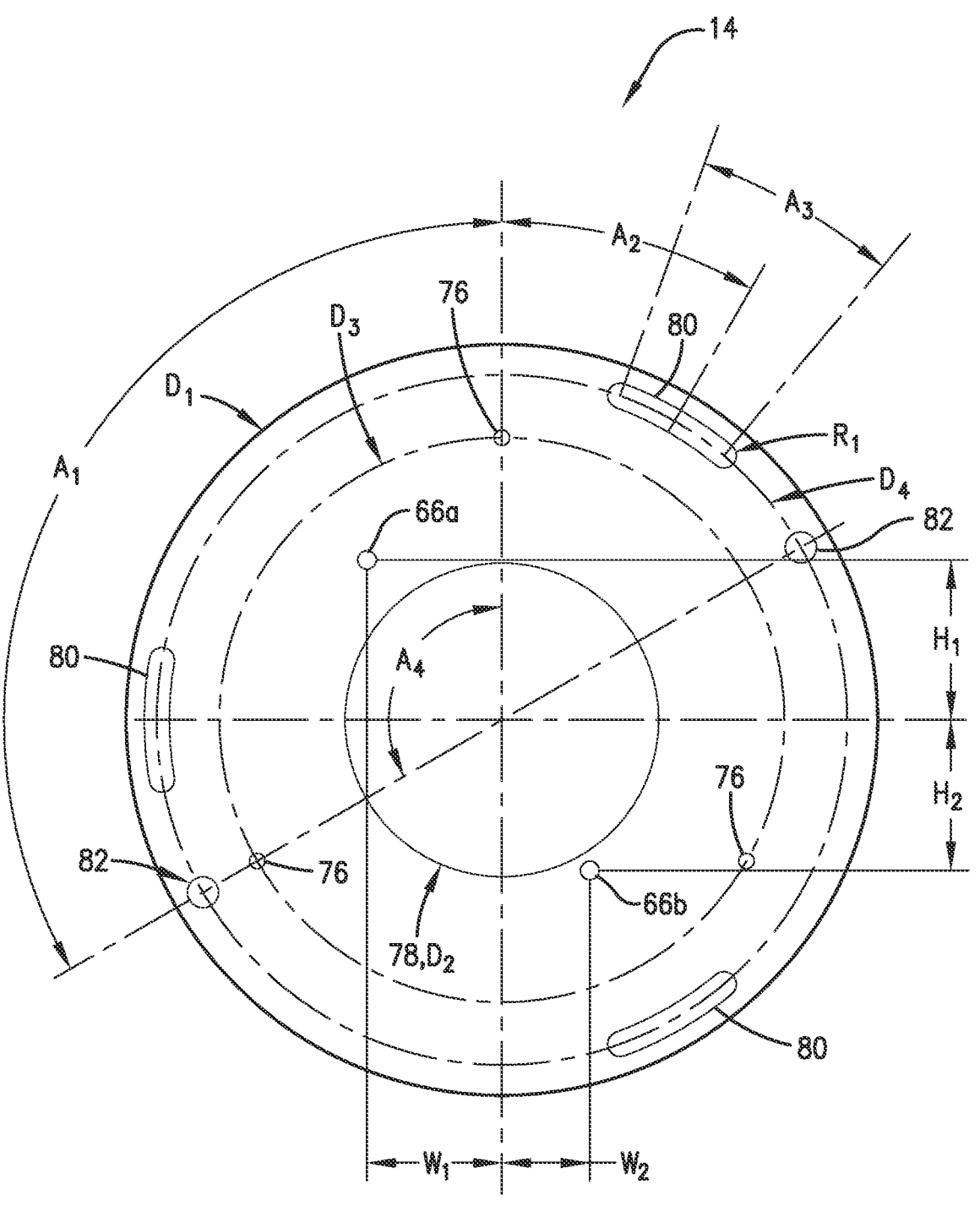
FIG. 9 is a front view of the sensor alignment plate.

FIG. 9 is a front view of the sensor alignment plate 14. In the exemplary embodiment, the sensor alignment plate 14 is a flat, annular plate having an outer diameter $D_1$ and a substantially constant thickness Ti (shown in FIG. 7). The thickness Ti and the diameter $D_1$ are selected to facilitate coupling the sensor alignment plate 14 to the first endshield 44 (shown in FIGS. 1-4) of the electric motor 11 (shown in FIGS. 1-3). More particularly, the sensor alignment plate 14 is positioned within the counterbore 54 and secured to the first endshield 44. In one example embodiment, the outer diameter $D_1$ is in a range between and including about one hundred and fifteen (115) millimeters and about one hundred and twenty-five (125) millimeters. In another example embodiment, the outer diameter $D_1$ is in a range between and including about one hundred and fifteen (115) millimeters and about one hundred and forty (140) millimeters. Preferably, the outer diameter $D_1$ is about one hundred and forty (140) millimeters. Certain aspects of the present invention contemplate, however, that the outer diameter $D_1$ may have any measure that enables the sensor alignment plate 14 to function as described herein.

In the exemplary embodiment, the sensor alignment plate 14 also includes a central opening 78 having an inner diameter $D_2$. The diameter $D_2$ is in the range between and including about forty-five (45) millimeters and about fifty-five (55) millimeters. Certain aspects of the present invention contemplate, however, that the diameter $D_2$ may have any measure that enables the sensor alignment plate 14 to function as described herein. In the example embodiment, the diameter $D_2$ is sized to enable the sensor circuit 72 to sense the sensor target 86 (shown in FIG. 2) coupled to an end of the rotor shaft 32. As described herein, the sensor target 86 is fixed relative to the rotor shaft 32 and oriented in a known position relative to the BEMF waveform of the electric motor 11.

The sensor alignment plate 14 includes a plurality of fastener holes 76. In the exemplary embodiment, each fastener hole 76 is a threaded hole sized to threadably receive a respective one of the fasteners 64 (shown, for example, in FIGS. 1 and 2). As illustrated in FIG. 9, the alignment plate 14 includes three (3) fastener holes 76, although fewer or more are within the ambit of some aspects of the present invention. The three (3) fastener holes 76 are equi-spaced about the central opening 78, each being separated from an adjacent fastener hole 76 by an angle $A_1$. The fastener holes 76 are located on a bolt circle having a diameter $D_3$ of about ninety (90) millimeters, although other or unequal diameters are contemplated.

In the exemplary embodiment, the sensor alignment plate 14 also includes a plurality of arcuate slots 80 formed generally concentric with the central opening 78. In the exemplary embodiment, each arcuate slot 80 is located on a diameter $D_4$ of about one hundred and ten (110) millimeters, although other diameters are contemplated by certain aspects of the present invention. In addition, each of the arcuate slots 80 extend circumferentially along diameter $D_4$ an arcuate distance defined by an angle $A_3$. The angle $A_3$ is in the range between and including about eighteen degrees (18°) and about twenty-two degrees (22°). Certain aspects of the present invention contemplate, however, that the arcuate angle $A_3$ may be any selected angle that enables he sensor alignment plate 14 to function as described herein. In the example embodiment, the three (3) arcuate slots 80 are equi-spaced about the central opening 78, each being separated from an adjacent fastener hole 76 by an angle $A_2$. The angle $A_2$ is about thirty degrees (30°) in the exemplary embodiment, although other angle measurements are contemplated. Each of the arcuate slots 80 include full radius ends having a radius $R_1$ of about two (2) millimeters. In other embodiment, differing or unequal radius measures $R_1$ are contemplated.

In the exemplary embodiment, the sensor alignment plate 14 includes the pin openings 66a and 66b for receiving respective alignments pins 62 (shown in FIGS. 2 and 6-8). In a preferred embodiment, the opening 66a is spaced from a center point of the sensor alignment plate 14, or opening 78, a height $H_1$ of about twenty-five and five tenths (25.5) millimeters and a width $W_1$ of about twenty-one and five tenths (21.5) millimeters. In addition, the opening 66b is spaced from the center point of the sensor alignment plate 14 a height $H_2$ of about twenty-four (24) millimeters and a width $W_2$ of about fourteen (14) millimeters. It is within the ambit of certain aspects of the present invention, however, for the measurements of $H_1$, $H_2$, $W_1$, and $W_2$ to be any selected measurement that enables the sensor alignment plate 14 to function described herein.

The sensor alignment plate 14 also includes a plurality of tooling holes 82, each lying on the diameter $D_4$, to facilitate fabrication of the sensor alignment plate 14. In the exemplary embodiment, the tooling holes 82 are substantially circular in shape and are spaced diametrically opposite each other. It is contemplated, however, that the sensor alignment plate 14 may include fewer or more tooling holes than the two (2) illustrated in FIG. 9.

Exemplary Methods

Described below is an exemplary calibration procedure for aligning the sensor alignment plate 14 to the electric motor 11 and an exemplary process for calibrating a respective rotary encoder assembly 12 for coupling to an aligned sensor alignment plate 14. The processes allow any electric motor 11 with a calibrated sensor alignment plate 14 to be paired with any respective, calibrated rotary encoder assembly 12.

Encoder Assembly Calibration

In the exemplary embodiment, a respective encoder assembly 12 is coupled to an alignment plate 14. The alignment pins 62 ensure that the encoder assembly 12 is locked into a specific location/orientation relative to the sensor alignment plate 14. The alignment plate 14 is then coupled to a "golden" or "master" electric motor. As used herein, the term "golden" or "master" includes a device, such as an electric motor 11 or encoder assembly 12, that has its respective tolerances (e.g., electrical and/or mechanical)

residing at the center of a normal distribution of tolerance measures. A normal distribution is a continuous probability distribution that is symmetrical on both sides of the mean.

The respective encoder assembly 12 is calibrated to the golden electric motor assembly. To calibrate the encoder assembly 12, for example, the sensor output signals will be gain and offset adjusted until the output signals are clear and the calculated error of the encoder assembly 12 falls within a predefined threshold. In the exemplary embodiment, the encoder assembly 12 includes an end shaft inductive sensor. Each encoder assembly 12 includes a self-calibration routine built into the sensor electronics, such as the sensor circuit 72. An on-board microprocessor (not shown) monitors the inductive sensor's analog signals. The microprocessor adjusts the inductive sensor's internal DC amplitude/offset registers, if the sine and cosine output signals produced by the inductive sensor are not the proper predefined shape and/or size. The calculated error is also referred to as "non-linearity." This is because the arctangent of a combination of theoretically ideal sine/cosine output signals results in a perfect line. When there is distortion or gain mismatch in either of the sensor output signals, the arctangent function output becomes non-linear. When the arctangent output of an encoder assembly 12 is compared to an ideal calculation (or "golden" sensor), the error of the encoder assembly 12 can be calculated by taking the difference between both arctangent resultants.

The encoder sensor described herein, such as the encoder assembly 12, is an end shaft inductive sensor. Certain aspects of the present invention contemplate, however, that the encoder assembly 12 may include different sensor orientations and technologies.

Encoder Assembly Mechanical Alignment

In the exemplary embodiment, a respective electric motor 11 is coupled to a servo driven functional tester (not shown). The servo driven functional tester is mechanically coupled to the rotor assembly 18 of the electric motor 11 and is used to rotate the motor to one or more known speeds.

A calibrated encoder assembly 12 is attached to an alignment plate 14, for example, by fasteners 64 (shown in FIGS. 1, 2, and 5). The alignment pins 62, which interconnect and rotatably fix the alignment plate 14 and the housing 70 to one another. More particularly, the pins 62 engage the respective (and aligned) openings 66a, 66b and alignment pin holes 68a, 68b. The alignment pins 62 ensure that the encoder assembly is locked into a specific location/orientation relative to the sensor alignment plate 14.

The sensor alignment plate 14 with the calibrated encoder assembly 12 is loosely coupled to the first endshield 44 of the electric motor 11 using a plurality of fasteners 84 (shown in FIGS. 1 and 2). More particularly, the sensor alignment plate 14 is positioned in the counterbore 54 defined in the first endshield 44. The slip fit, described above, between sensor alignment plate 14 and the annular wall 56, ensures the sensor alignment plate 14 is positioned and held substantially concentric relative to the rotation axis "A." Each fastener 84 extends through a respective one of the arcuate slots 80 (shown in FIG. 9) and is threadably attached to the first endshield 44.

The electric motor 11 is then rotated by the servo driven functional tester. That is, the rotor shaft 32 of the electric motor 11 is rotated by the functional tester and the resulting back electromotive force (BEMF) waveform is measured and recorded. The measurement of the BEMF can be accomplished, for example, using a data acquisition unit (DAQ) such as a commercially available oscilloscope that is capable of recording data to a computer-readable medium, such as a USB flash drive. In the example embodiment, the electric motor 11 is a three-phase motor, where a BEMF of each phase is measured, the respective phases being referred to as U phase, V phase, and W phase. The DAQ measures real world phenomenon (analog signals) and converts it to a digital format to be processed by a computer. For example, the DAQ measures a U phase waveform, a V phase waveform, and a W phase waveform.

The sensor output signals (e.g., the sine/cosine output signals) of the calibrated encoder assembly 12 are measured and recorded, for example, using the DAQ. The sensor output signals are correlated to the BEMF of the electric motor 11. That is, an orientation of the alignment plate is adjusted relative to the electric motor 11 to align the sensor output signal waveform to the BEMF waveform within a predetermined threshold range.

More specifically, the sensor alignment plate 14 is rotated on the endshield 44 (such rotation being limited but permitted by the interaction between the fasteners 84 and the arcuate slots 80) until alignment is attained. In the example embodiment, the ideal "zero" position of the electric motor 11 is defined by the instance when the U phase falling edge crosses zero. The ideal "zero" position of the calibrated encoder assembly 12 is defined by the instance when the sine output signal waveform rising edge crosses zero. Alignment is attained when the ideal "zero" positions of the electric motor 11 and the calibrated encoder assembly 12 occur at substantially the same time, within a predetermined threshold range.

The alignment plate 14 is secured or 'locked' into place on the first endshield 44 in the adjusted orientation. In one embodiment, aligning the sensor alignment plate 14 (prior to being locked into place) accurately is accomplished by clocking the alignment plate 14 relative to the first endshield 44. For example, a system much like what was used to set the points in a distributer of a car engine may be implemented where a tool (such as a screwdriver) is inserted into notches that cause clocking of the sensor alignment plate 14 as the screwdriver is twisted in one or the other direction. Once aligned, the plurality of fasteners 84 extending through the arcuate slots 80 are tightened.

The method described above facilitates mounting a calibrated rotary position sensor 12 to an electric motor 11 so that a sensor output signal waveform produced by the calibrated rotary position sensor 12 is aligned with a back electromotive force (BEMF) waveform of the electric motor 11.

In another example embodiment, a respective electric motor 11 is coupled to a servo driven functional tester (not shown). The servo driven functional tester is mechanically coupled to the rotor assembly 18 of the electric motor 11 and is used to rotate the motor to one or more known speeds.

A "golden" or "master" encoder assembly (i.e., an encoder assembly that is used as a standard for alignment) is coupled to the sensor alignment plate 14, for example, by fasteners 64 (shown in FIGS. 1, 2, and 5). As previously noted, the alignment pins 62 preferably ensure that the encoder assembly is locked into a specific location/orientation relative to the sensor alignment plate 14.

The sensor alignment plate 14 with the "golden" encoder assembly is loosely coupled to the first endshield 44 of the electric motor 11 using a plurality of fasteners 84 (shown in FIGS. 1 and 2). More particularly, the sensor alignment plate 14 is positioned in the counterbore 54 defined in the first endshield 44. The slip fit, described above, between sensor alignment plate 14 and the annular wall 56 ensures the sensor alignment plate 14 is positioned and held substantially concentric relative to the rotation axis "A." Each fastener 84 extends through a respective one of the arcuate slots 80 (shown in FIG. 9) and is threadably attached to the first endshield 44.

The electric motor 11 is then rotated by the servo driven functional tester. That is, the rotor shaft 32 of the electric motor 11 is rotated by the functional tester and the resulting back electromotive force (BEMF) waveform is measured and recorded. The measurement of the BEMF can be accomplished, for example, using a data acquisition unit (DAQ) such as a commercially available oscilloscope that is capable of recording data to a computer-readable medium, such as a USB flash drive. In the example embodiment, the electric motor 11 is a three-phase motor, the respective phases being referred to as U phase, V phase, and W phase. The DAQ measures real world phenomenon (analog signals) and converts it to a digital format to be processed by a computer.

The sensor output signals (e.g., the sine/cosine output signals) of the "golden" encoder assembly 12 are measured and recorded, for example, using the DAQ. The sensor output signals are correlated to the BEMF of the electric motor 11. That is, an orientation of the alignment plate is adjusted relative to the electric motor 11 to align the sensor output signal waveform to the BEMF waveform within a predetermined threshold range.

More specifically, the sensor alignment plate 14 is rotated on the endshield 44 about the fasteners 84 extending through the arcuate slots 80 until alignment is attained, as described above. The alignment plate 14 is secured or 'locked' into place on the first endshield 44 in the adjusted orientation. The "golden" encoder assembly may then be removed from the electric motor 11. The result of the above processes is a motor assembly 11 having a mechanically aligned sensor alignment plate 14 that is ready to accept any calibrated encoder assembly 12. The mechanically aligned sensor alignment plate 14 facilitates field service of the electric motor 11 (e.g., swapping out the rotary encoder assembly 12 with a new rotary encoder assembly, such that the swap does not affect the alignment/correlation of the signal waveforms).

The invention described herein provides systems and techniques that allow the alignment of the motor and a rotary encoder to be repeatable while facilitating easy manufacturing (e.g., the motor controller may be preprogrammed with the initial alignment/correlation) and easy field service (e.g., swapping out the rotary encoder with a new rotary encoder such that the swap does not affect the alignment/correlation). The systems and techniques described herein have the advantage that no tool is required beyond the tools required to mechanically replace the sensor, thereby making the replacement of a rotary encoder assembly easier to support by a wider audience of users.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

The invention claimed is:

1. An electric motor assembly comprising:
   a motor including—
      a stator assembly,
      a rotor assembly comprising a rotor shaft rotatable about a rotor axis,
      a housing defining a motor chamber receiving at least a portion of the rotor assembly and the stator assembly, the housing including an endshield rotatably supporting the shaft, and
      a sensor target fixed relative to the rotor shaft and thereby oriented in a known position relative to a back electromotive force (BEMF) waveform of the motor;
   a rotary position sensor configured to sense the sensor target; and
   an alignment plate,
   said rotary position sensor being fixed relative to the alignment plate,
   said alignment plate being adjustably coupled to the endshield for rotational adjustment that is substantially concentric with the rotor axis, such that the rotary position sensor is adjustable to align a signal waveform produced by the rotary position sensor with the BEMF waveform within a predetermined measurement range,
   said endshield including a counterbore defined therein, the counterbore being substantially concentric with the rotor axis,
   said counterbore presenting an inner diameter sized to define a slip fit between the counterbore and the alignment plate,
   said alignment plate presenting an outer diameter,
   said outer diameter of the alignment plate being at least one hundred and fifteen (115) millimeters.

2. The electric motor assembly in accordance with claim 1,
   said counterbore defining an annular wall and an adjacent planar base wall, the planar base wall being substantially perpendicular to the annular wall and the rotor axis.

3. The electric motor assembly in accordance with claim 2,
   said counterbore including a relief cut defined between the annular wall and the adjacent planar base wall, the relief cut configured to enable the alignment plate to sit flush against the base wall.

4. The electric motor assembly in accordance with claim 2,
   said annular wall presenting an inner diameter sized to define a slip fit between the annular wall and the alignment plate.

5. The electric motor assembly in accordance with claim 1, said outer diameter of the alignment plate being in a range between and including about one hundred and fifteen (115) millimeters and about one hundred and forty (140) millimeters.

6. The electric motor assembly in accordance with claim 1, further comprising two or more spaced apart alignment pins, said rotary position sensor including a sensor housing defining two or more pin holes, said alignment plate defining two or more pin openings, each of which is aligned with a respective one of the pin holes, each of said alignment pins being received in aligned ones of the pin holes and pin openings, such that the pins secure the rotary position sensor in a rotatably fixed position relatively to the alignment plate.

7. The electric motor assembly in accordance with claim 1,

said alignment plate defining a central opening therethrough, said central opening having an inner diameter in the range between and including about forty-five (45) millimeters and about fifty-five (55) millimeters.

8. The electric motor assembly in accordance with claim 1, further comprising an alignment plate fastener, said alignment plate including an arcuate slot defined therethrough, said arcuate slot being concentric with the rotor axis, said alignment plate fastener extending through the arcuate slot and being coupled to the endshield.

9. The electric motor assembly in accordance with claim 8, said alignment plate including three arcuate slots defined therethrough, said arcuate slots being concentric with the rotor axis and equi-spaced relative to each other.

\* \* \* \* \*